US011933091B2

(12) United States Patent
Weichsel

(10) Patent No.: US 11,933,091 B2
(45) Date of Patent: Mar. 19, 2024

(54) MOTOR-VEHICLE DOOR LOCK

(71) Applicant: Kiekert AG, Heiligenhaus (DE)

(72) Inventor: Ulrich Weichsel, Duisburg (DE)

(73) Assignee: Kiekert AG, Heiligenhaus (DE)

( * ) Notice: Subject to any disclaimer, the term of this patent is extended or adjusted under 35 U.S.C. 154(b) by 578 days.

(21) Appl. No.: 15/734,585

(22) PCT Filed: May 31, 2019

(86) PCT No.: PCT/DE2019/100479
§ 371 (c)(1),
(2) Date: Dec. 3, 2020

(87) PCT Pub. No.: WO2019/233524
PCT Pub. Date: Dec. 12, 2019

(65) Prior Publication Data

US 2021/0230911 A1 Jul. 29, 2021

(30) Foreign Application Priority Data

Jun. 5, 2018 (DE) ..................... 10 2018 113 270.0

(51) Int. Cl.
*E05B 85/26* (2014.01)
*E05B 77/36* (2014.01)
(Continued)

(52) U.S. Cl.
CPC .............. *E05B 85/26* (2013.01); *E05B 77/36* (2013.01); *E05B 81/04* (2013.01); *E05B 81/14* (2013.01); *E05B 81/20* (2013.01)

(58) Field of Classification Search
CPC .......... E05B 81/14; E05B 81/20; E05B 85/20; E05B 85/24; E05B 85/243; E05B 85/26; E05B 81/90
See application file for complete search history.

(56) References Cited

U.S. PATENT DOCUMENTS 6,659,515 B2 * 12/2003 Raymond ............... E05B 81/20 292/201
7,059,640 B2 * 6/2006 Tensing .................. E05B 81/14 292/216
(Continued)

FOREIGN PATENT DOCUMENTS

DE 102004011798 B3 10/2005
DE 102004034628 A1 2/2006
(Continued)

OTHER PUBLICATIONS

Translation of International Search Report dated Aug. 28, 2019, for International Patent Application No. PCT/DE2019/100479.

*Primary Examiner* — Alyson M Merlino
(74) *Attorney, Agent, or Firm* — Renner, Otto, Boisselle & Sklar, LLP

(57) ABSTRACT

A motor-vehicle door lock, which is equipped with a locking mechanism, comprising a rotary latch and at least one pawl, and with a closing drive and an opening drive for the locking mechanism. The rotary latch can be transferred into an overtravel position by means of the closing drive. According to the invention, in order to open the locking mechanism, the rotary latch is held in the overtravel position by means of the closing drive. In this way, the opening drive can open the pawl and subsequently the closing drive can travel back when the locking mechanism is open.

17 Claims, 7 Drawing Sheets

(51) Int. Cl.

| | |
|---|---|
| ***E05B 81/04*** | (2014.01) |
| ***E05B 81/14*** | (2014.01) |
| ***E05B 81/20*** | (2014.01) |

(56) References Cited

U.S. PATENT DOCUMENTS

| | | | | |
|---|---|---|---|---|
| 7,210,714 | B2 * | 5/2007 | Berghahn | E05B 81/20 292/216 |
| 7,341,290 | B2 * | 3/2008 | Torka | E05B 85/243 292/216 |
| 8,888,150 | B2 * | 11/2014 | Nagaoka | E05B 77/38 292/341.12 |
| 8,919,828 | B2 * | 12/2014 | Barth | E05B 85/243 292/201 |
| 10,920,464 | B2 * | 2/2021 | Im | E05B 81/14 |
| 2009/0100886 | A1 * | 4/2009 | Orzech | E05B 81/14 70/265 |

FOREIGN PATENT DOCUMENTS

| | | | |
|---|---|---|---|
| DE | 102006035556 | A1 | 1/2008 |
| DE | 102007057560 | A1 | 6/2009 |
| DE | 202008015789 | U1 | 4/2010 |
| DE | 102013103245 | A1 | 10/2014 |
| EP | 1048808 | A1 | 11/2000 |
| EP | 1404936 | B1 | 10/2004 |
| EP | 2050903 | A2 | 4/2009 |

* cited by examiner

MOTOR-VEHICLE DOOR LOCK

FIELD OF DISCLOSURE

The invention relates to a motor vehicle door latch, comprising a locking mechanism consisting of a catch and at least one pawl, further comprising a closing drive and an opening drive for the locking mechanism, it being possible to transfer the catch to an overtravel position with the aid of the closing drive.

BACKGROUND OF DISCLOSURE

Motor vehicle door latches which comprise a locking mechanism consisting of a catch and at least one pawl, and which are also equipped with an opening drive for the locking mechanism, are often referred to in practice as so-called electronic locks. This is due to the fact that, with the aid of the opening drive and an electric motor, which is usually implemented here, the locking mechanism is usually opened purely electrically, namely by the opening drive lifting the pawl out of engagement with the catch. As a result, the catch can pivot outward with the aid of a spring and release a previously captive locking pin, as is described in detail in connection with a two-pawl locking mechanism in the applicant's application DE 10 2013 103 245 A1.

The closing drive ensures that the locking mechanism is also closed with the aid of an electric motor. For this purpose, the locking mechanism first assumes a pre-ratchet position by, for example, an operator manually closing an associated motor vehicle door. Starting from this pre-ratchet position, the closing drive then ensures that the locking mechanism is transferred to the main ratchet position. So that the pawl engages securely in the associated main ratchet, the closing drive ensures that the locking mechanism or the catch as a whole is transferred to an overtravel position beyond its main ratchet position.

In the generic prior art according to DE 10 2006 035 556 A1, both an opening drive and a closing drive or a closing aid are implemented. The catch can also be transferred beyond its ratchet position or main ratchet position to an overtravel position or the aforementioned overtravel position. Overall, the aim of the known teaching is to avoid damage to the latch that occurs during use.

In a latch, in particular for vehicle doors, which is described in DE 10 2004 011 798 B3, a combined motorized closing and opening aid is implemented. Here, a first output element acts as a closing aid, while a second output element takes on the function of an opening aid. Since an associated output gear acts on the first output element in one direction and on the second output element in an opposite direction, both functions can be implemented separately from one another.

Finally, EP 1 404 936 B1 concerns a latch, in particular for motor vehicle doors or tailboards, which works similarly. In this case, too, a first output element works as an opening aid on the pawl in a first direction of travel of the drive, while a second output element acts as a closing aid on the catch in a second direction of travel of the drive part opposite to the first direction of travel.

The prior art has fundamentally proven itself in terms of the design and implementation of two-pawl locking mechanisms and, in particular, multi-pawl locking mechanisms, as described in DE 10 2013 103 245 A1. This is because such multi-pawl locking mechanisms are characterized by the fact that they can be moved into the open position particularly quietly. However, it has been shown in practice that improvements are still required in this area. Because of the increasing weight of the side doors equipped with such a motor vehicle door latch, increased restoring forces of associated rubber door seals, which forces stress the locking mechanism and associated levers during the opening process, must likewise be overcome during the closure process. As a result, noises which are perceived as annoying by operators are still present during opening. This is where the invention comes in.

SUMMARY OF DISCLOSURE

The invention is based on the technical problem of further developing such a motor vehicle door latch so that the noise generation, in particular during an opening process of the locking mechanism, is further reduced compared with previous embodiments.

To solve this technical problem, the invention proposes, in order to open the locking mechanism in a generic motor vehicle door latch, that the catch is be held in the overtravel position with the aid of the closing drive so that the opening drive opens the pawl and the closing drive can then move back when the locking mechanism is open.

A particularly gentle opening can be observed when using this special approach and design of the invention. The invention is firstly based on the knowledge that the overtravel position of the catch adopted in order to open the locking mechanism with the aid of the closing drive ensures that all the elements of an associated release chain are decoupled from opening forces built up by a rubber door seal. That is, as a result of the overtravel position adopted by the catch and consequently by the locking mechanism, the release chain in question can be transferred to the open position with practically no force, and without this being accompanied by annoying noise generation.

In the simplest case, the release chain actually consists of the opening drive and a release lever on which the opening drive advantageously works. The release lever in turn ensures that the pawl is lifted from its ratchet position with respect to the catch, which position is adopted when the locking mechanism is closed. Since, according to the invention, the catch is held in the overtravel position for opening the locking mechanism and firstly with the aid of the closing drive, there is no longer latching between the pawl and the catch. The pawl can consequently be opened when the catch is in the overtravel position without interrupting a latching effect with the aid of the opening drive or the release chain in general.

The pawl which is held in the open position with the aid of the opening drive now ensures that the closing drive can then move back when the locking mechanism is open. Here, the invention is based on the further knowledge that when the closing drive moves back, the catch can move from its overtravel position into the open position (optionally with the aid of a spring). During this process, the pawl is still held in its open position with the aid of the opening drive. The catch passes the pawl, which cannot engage in said catch and can then come to abut the opened catch. This is because as soon as the catch, and consequently the locking mechanism, is open, the opening drive can also move back to its home position, because the pawl is then held so as to abut the catch and cannot engage in the catch in a latching manner when the locking mechanism then adopts the open position.

In this way, a particularly gentle opening of the locking mechanism, which takes place almost without force, is possible, because the pawl is opened when the catch is in the overtravel position with the aid of the opening drive without overcoming any latching forces. The closing drive then moves back when the locking mechanism is open, so that opening forces built up by the rubber door seal can be reduced in a targeted manner. As soon as the locking mechanism has adopted the open position, the opening drive is also moved back to its starting position because the pawl is held so as to abut the open catch. All of these processes are accompanied by a remarkably low level of background noise compared to the prior art. Herein lie the essential advantages.

The opening drive works advantageously on the aforementioned release lever as a further component of the release chain. In addition, an internal operating lever and/or an external operating lever can be provided for mechanically acting on the locking mechanism. The internal operating lever and/or the external operating lever consequently become part of the release chain and ensure that the locking mechanism in question can, according to the invention, be opened not only by a motor but also mechanically. Moreover, the internal operating lever and/or the external operating lever allow additional and mechanical ejection. This generally means interruption of a closing process and/or of an electrical opening process.

For mechanical ejection, the internal operating lever and/or the external operating lever usually work on a drive pawl as part of the closing drive and in this way interrupt the closing drive. In addition, it is conceivable that an electrical opening process can be interrupted mechanically. For this purpose, the opening drive and the external operating lever and/or the internal operating lever can engage on a common stop edge of the release lever. Since the release lever lifts the pawl from its engagement with the catch, it has proven useful for the release lever to be mounted coaxially with the pawl. In this way, the release lever can advantageously interact with a pin of the pawl during an opening process of the locking mechanism.

As has already been explained, the closing drive has, inter alia, a drive pawl and a transfer lever. The drive pawl is generally rotatably connected at one end to the transfer lever. The other end of the drive pawl mostly interacts with a pin of the catch. The design is also made such that the drive pawl converts a motorized pivoting movement of the transfer lever into a pushing movement that works on the pin of the catch to close the catch.

This means that an electric motor, as part of the closing drive, initially ensures that the transfer lever is pivoted. The transfer lever for its part is generally mounted in a stationary manner. The thus motorized pivoting movement of the transfer lever now leads to a pushing movement of the drive pawl, because one end of the drive pawl is mounted on the transfer lever. The other end of the drive pawl is now moved toward the pin of the catch by the pivoting movement of the transfer lever and ensures that a corresponding pushing movement acts on the pin. As a result of this pushing movement on the pin of the catch, the catch and therefore the locking mechanism are closed.

So that the drive pawl can move in a guided manner toward the pin of the catch and execute the aforementioned pushing movement, the drive pawl is generally guided with the aid of a guide pin on the release lever. For this purpose, the guide pin in question on the release lever interacts with a guide contour on the drive pawl.

The drive pawl is generally not only equipped with the aforementioned guide contour that interacts with the release lever; rather, in most cases, the drive pawl also has an ejection contour. The ejection contour, for its part, interacts with the internal operating lever and/or the external operating lever. As has already been explained, the interaction described occurs between the guide contour and the guide pin on the release lever or the release lever itself. This ensures that, during the described closing process, the drive pawl is oriented toward the pin of the catch in a guided manner and, after it has abutted the pin, acts on the pin with the desired pushing movement. In addition, the guide contour can interact with the opening drive via the release lever.

The guide contour and the ejection contour are generally spaced apart from one another. In this way, a distinction can be made between an electrical and a motorized movement range and a manual and a mechanical movement range of the release lever. The electrical movement range of the release lever corresponds to the fact that the release lever is acted upon by the opening drive to lift the pawl from the catch to such an extent that the pin or guide pin on the release lever leaves the guide contour, but does not or cannot interact with the ejection contour. In contrast, when completing the mechanical movement range, the guide pin of the release lever acted upon by the internal operating lever and/or external operating lever interacts with the ejection contour on the drive pawl. As a result, the drive pawl is ejected and any closing process is interrupted, because this interrupts a mechanical connection from the closing drive via the drive pawl to the pin on the catch.

The drive pawl is usually designed as a frame pawl enclosing a cavity. The guide pin of the release lever can be moved in the cavity. As already explained above, the electrical movement range corresponds to the fact that the guide pin of the release lever leaves the guide contour and is moved into the interior of the cavity without being able to interact with the ejection contour of the drive pawl. Internal longitudinal legs of the frame pawl generally define the guide contour on one side and the ejection contour on the other side, which legs consequently extend opposite one another and substantially in the same direction.

The result is a motor vehicle door latch, and in particular an electric lock, which does not only allow particularly gentle and thus quiet opening; rather, the motor vehicle door latch according to the invention also allows additional mechanical ejection. This means that any closing process can be interrupted mechanically at any time. This is of particular importance if, for example, an operator's item of clothing or, in the worst-case scenario, a finger, should be trapped in the closing door gap between a door leaf and the vehicle body during the closing process. In any case, the closing process can be immediately interrupted in this case by the operator interrupting the closing process or separating the mechanical connection via the internal operating lever and/or external operating lever. This can be done simply by the operator in question actuating an external door handle, for example, and thereby acting on the external operating lever. Alternatively or in addition, an internal door handle and therefore the internal operating lever can also be acted on in order to bring about the desired mechanical separation and the interruption of the closing process and/or electrical opening process. Herein lie the essential advantages.

BRIEF DESCRIPTION OF DRAWINGS

The invention is explained in greater detail below with reference to drawings, which show just one exemplary embodiment, and in which.

DETAILED DESCRIPTION

Figure 1:
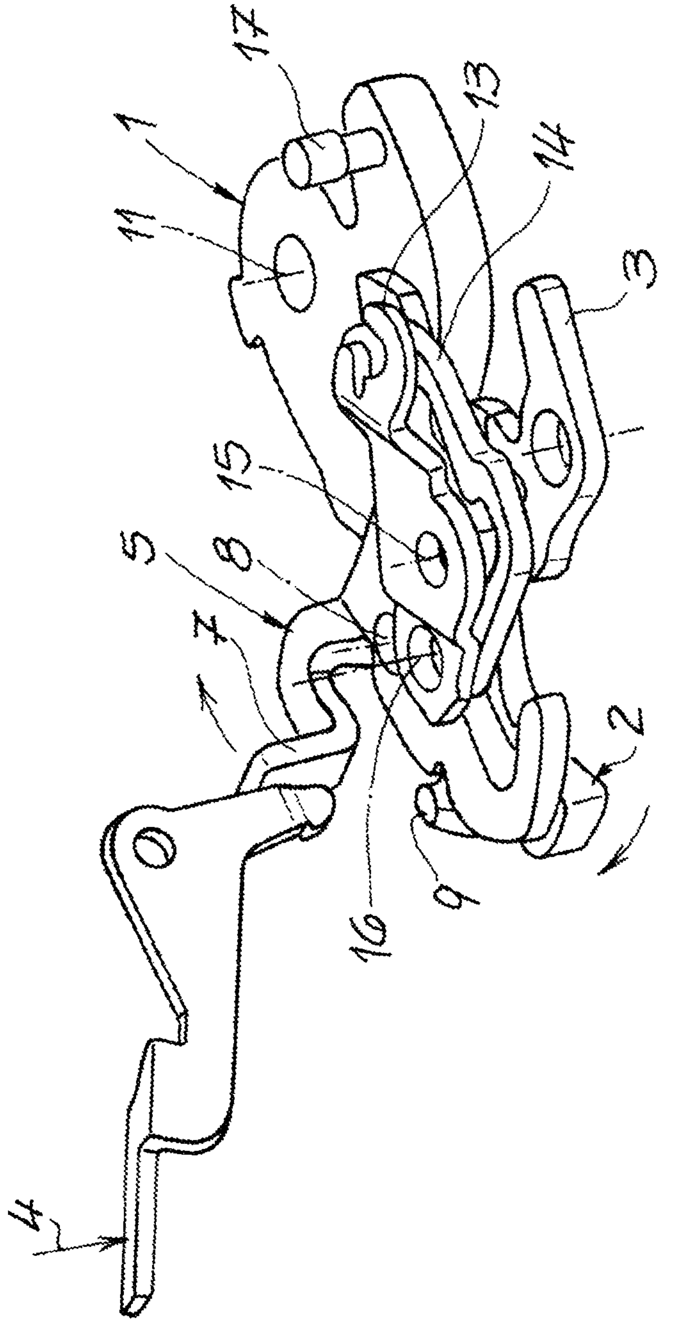
FIG. 1 is a first perspective view of the motor vehicle door latch according to the invention reduced to the components essential to the invention.
Figure 2:
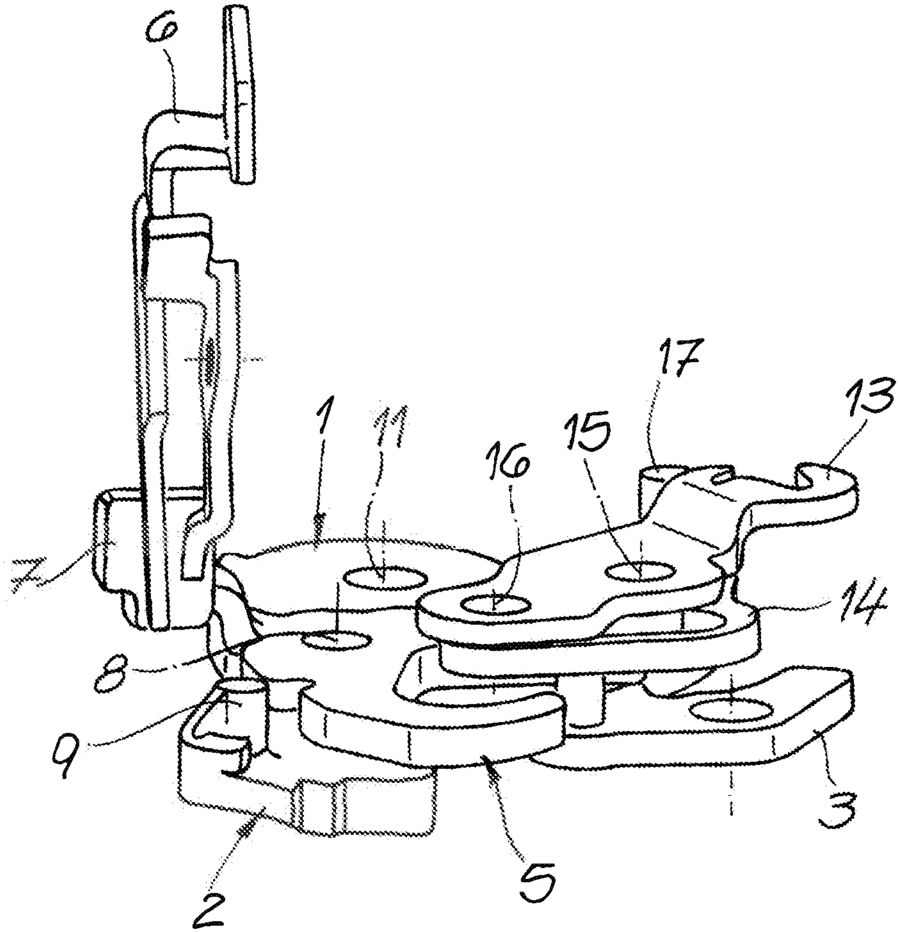
FIG. 2 is a different perspective view of the subject matter according to FIG. 1.

FIGS. 1 to 4 show a motor vehicle door latch which is reduced to the components and elements essential to the invention. Firstly, a locking mechanism 1, 2, 3 consisting of a catch 1 and a pawl 2, 3 can be seen. According to the exemplary embodiment, two pawls 2, 3 are implemented. The invention is therefore not limited to a multi-pawl locking mechanism 1, 2, 3. The first pawl 2 is designed as a convenience pawl 2, in accordance with the terminology in the aforementioned DE 10 2013 103 245 A1. In contrast, the second pawl 3 is a pre-ratchet pawl 3 (see in particular FIG. 4).

Figure 3:
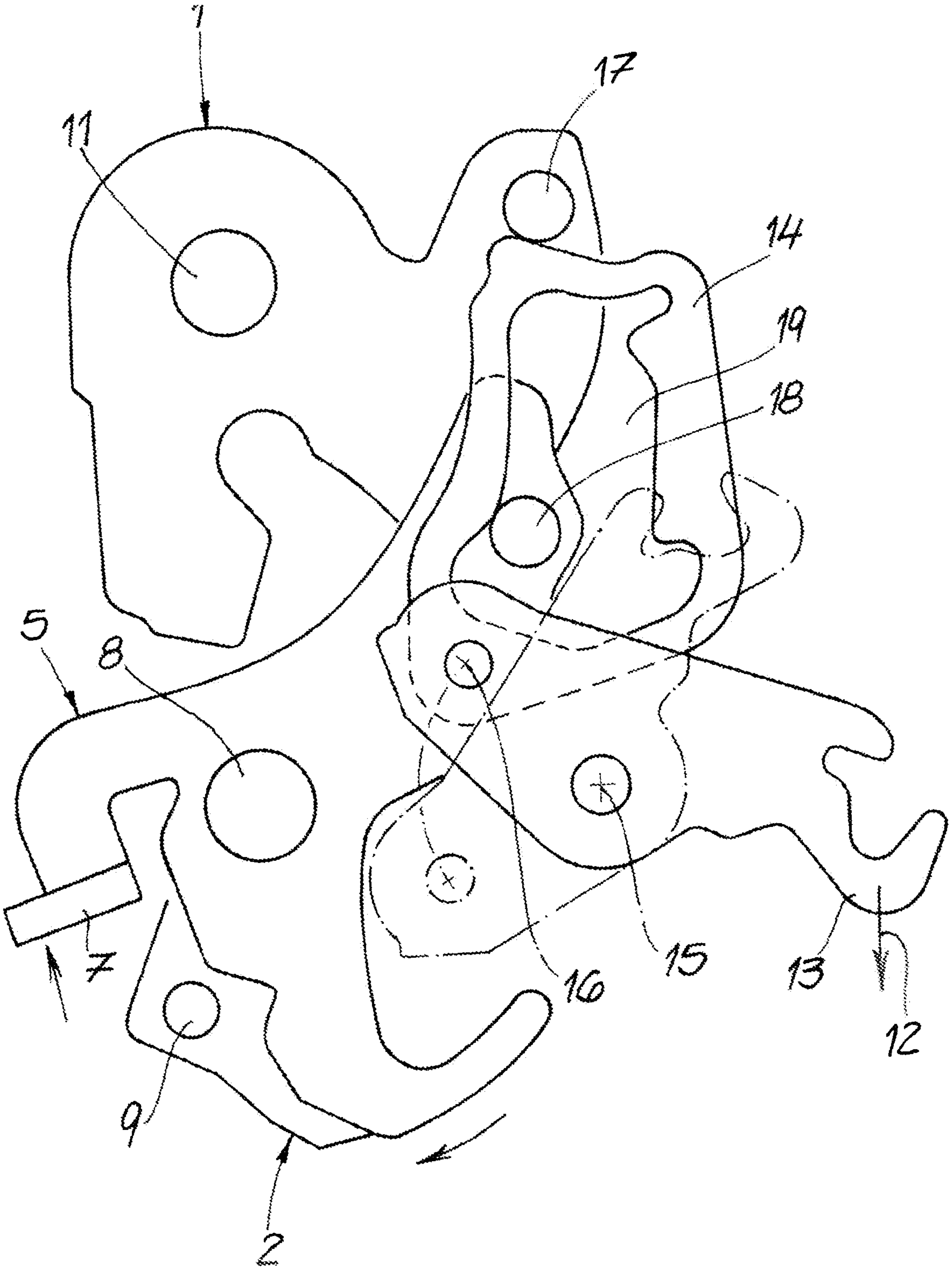
FIG. 3 is a front view of the subject matter according to FIGS. 1 and 2.
Figure 4:
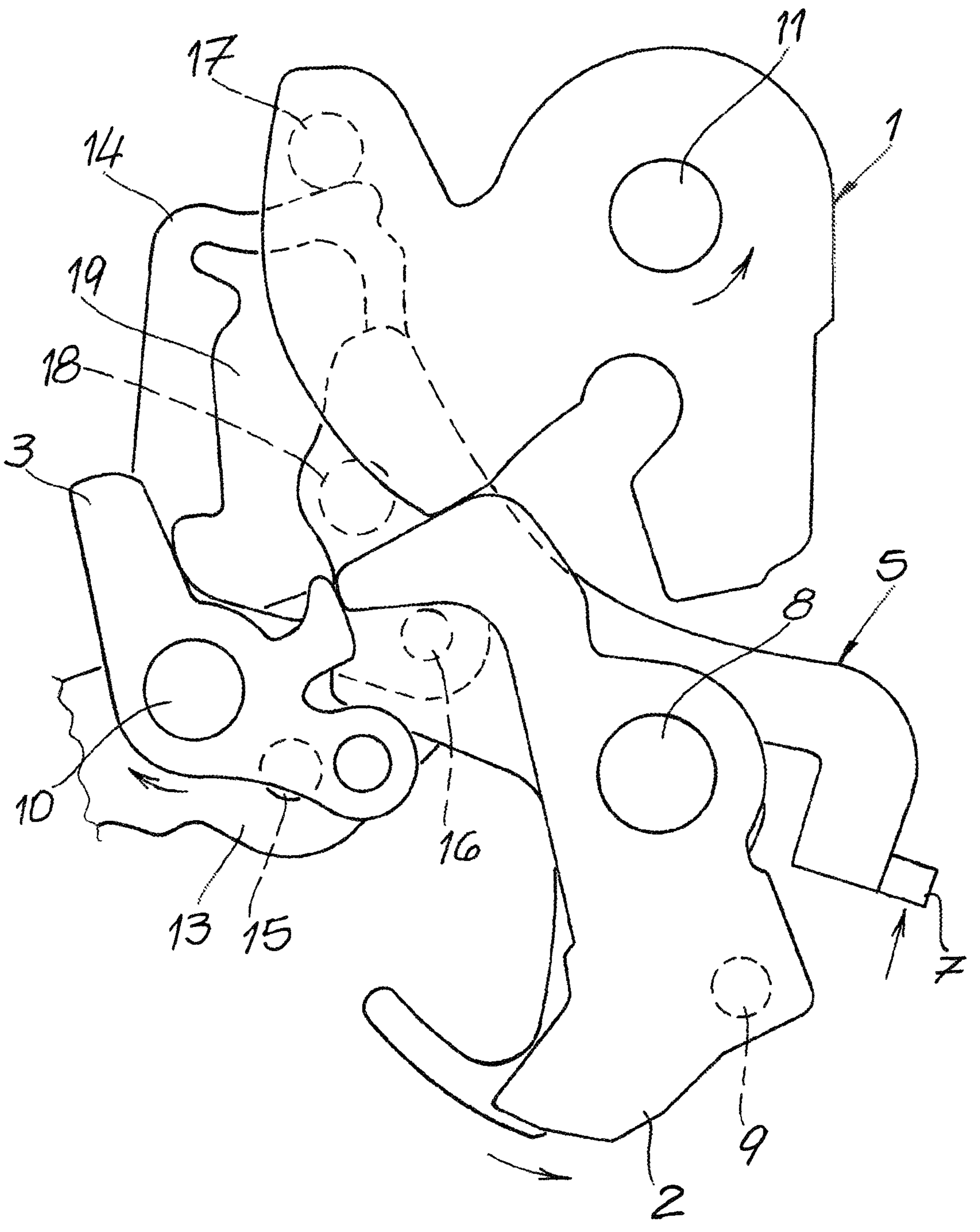
FIG. 4 is an associated rear view.

In FIGS. 3 and 4, the locking mechanism 1, 2, 3 is in a main ratchet position and interacts with a locking pin (not shown), which may be arranged on a motor vehicle body. Both pawls 2, 3 are each rotatably and stationarily mounted in a latch case (not shown). In the main ratchet position shown in FIGS. 3 and 4, the first pawl or convenience pawl 2 ensures that the catch 1 is held in this position. The second pawl or pre-ratchet pawl 3 ensures that the convenience pawl 2 is not moved out of its position in which it is retracted into a main ratchet of the catch 1. In the following, the focus is mainly on the first pawl or convenience pawl 2.

To open the locking mechanism 1, 2, 3, an opening drive 4 works on a release lever 5, as is indicated in FIG. 1. In addition, the locking mechanism 1, 2, 3 can be opened mechanically and independently of the electromotive opening drive 4 with the aid of an internal operating lever or external operating lever 6, independently of the electromotive opening drive 4. For this purpose, an internal door handle or external door handle (not expressly shown) ensures that the internal operating lever or external operating lever 6 works on the release lever 5 in a direction similar to that of the opening drive 4 (see FIG. 2).

The release lever 5 is correspondingly acted on in the opening direction in the direction of the arrow indicated in FIG. 1, which results in a stop edge 7 on the release lever 5 being moved to the right, and moved upward in the front view according to FIG. 3 and the rear view of FIG. 4, as indicated by an associated arrow in FIGS. 3 and 4.

The opening movement of the release lever 5 implemented in this way results the release lever 5 executing a clockwise pivoting movement about its axis 8, as shown in FIG. 3. The release lever 5 and the first pawl or convenience pawl 2 are actually mounted coaxially, taking into account the common axis 8 in the latch housing (not shown in more detail). In any case, the clockwise rotational movement of the release lever 5 as shown in FIG. 3, which movement accompanies an opening process of the locking mechanism 1, 2, 3, results in the first pawl or convenience pawl 2 also being moved in the direction of the clockwise movement. This is ensured by a connecting pin 9, which is connected to the first pawl or convenience pawl 2 in question and toward which the release lever 5 moves during its described (clockwise) pivoting movement in the course of an opening process in FIG. 3.

As a result, the first pawl or convenience pawl 2 is lifted off the catch 1. This is because the first pawl 2 in question executes a corresponding counterclockwise movement, which can be seen in the rear view according to FIG. 4, about the common axis 8 with the release lever 5. As a result, the catch 1 is released from the first pawl or convenience pawl 2, because during this process the release lever 5 simultaneously pivots the pre-ratchet pawl 3 about its axis 10 in the clockwise direction also indicated in FIG. 4. The catch 1, which has now been released, can consequently pivot open about its axis 11 with the aid of a spring in the counterclockwise direction indicated in FIG. 4, and thereby releases the previously captive locking pin. The locking mechanism 1, 2, 3 is open.

In principle, it does not matter whether this opening process takes place via the electromotive opening drive 4 or via the internal door handle or external door handle and the internal operating lever or external operating lever 6. This is because both approaches result overall in the release lever 5 executing the pivoting movement described and thereby lifting the first pawl or convenience pawl 2 out of its engagement with the catch 1 as described. Furthermore, the release lever 5 lifts the pre-ratchet pawl 3 from the convenience pawl 2.

In addition to the aforementioned opening drive 4, the motor vehicle door latch according to the invention is also equipped with a closing drive 12, 13, 14. The closing drive 12, 13, 14 has a drive pawl 14. A transfer lever 13 is also provided. The transfer lever 13 is mounted in a stationary and rotatable manner within the motor vehicle door latch or a motor vehicle housing, specifically about an axis 15. One end of the drive pawl 14 is rotatably connected to the transfer lever 13. A further axis of rotation 16 is provided for this purpose. At its other end, the drive pawl 14 interacts with a pin 17 on the catch 1 for closing the locking mechanism 1, 2, 3, as will be explained in more detail below.

The drive pawl 14 converts a motorized pivoting movement of the transfer lever 13 into a pushing movement that works on the pin 17 on the catch 1, so that the catch 1 and thus the locking mechanism 1, 2, 3 as a whole can be closed in this way. This can be seen in particular in FIG. 5A to 5C. A pivoting movement of the transfer lever 13 about the associated axis 15 in the clockwise direction indicated in FIG. 5A results in the drive pawl 14 mounted on the transfer lever 13 being moved toward the pin 17 on the catch 1. For this purpose, a drive or electric motor 12 works on the transfer lever 13, as shown in FIG. 3. The movement is guided by the axis 16 and by a pin or guide pin 18 on the release lever 5.

Figure 5A:
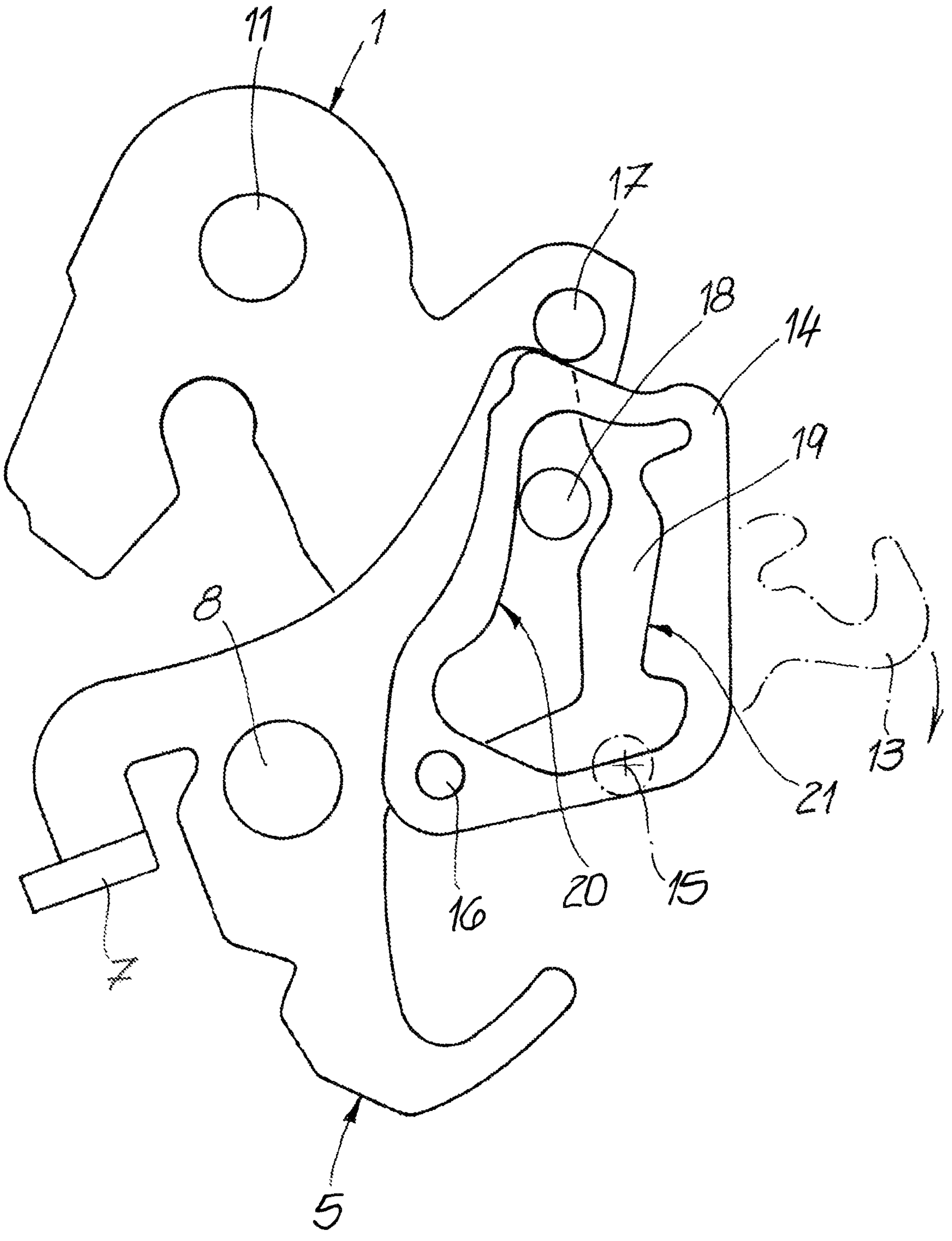
FIG. 5A to 5C show different functional positions when closing or electrically opening the locking mechanism.
Figure 5B:
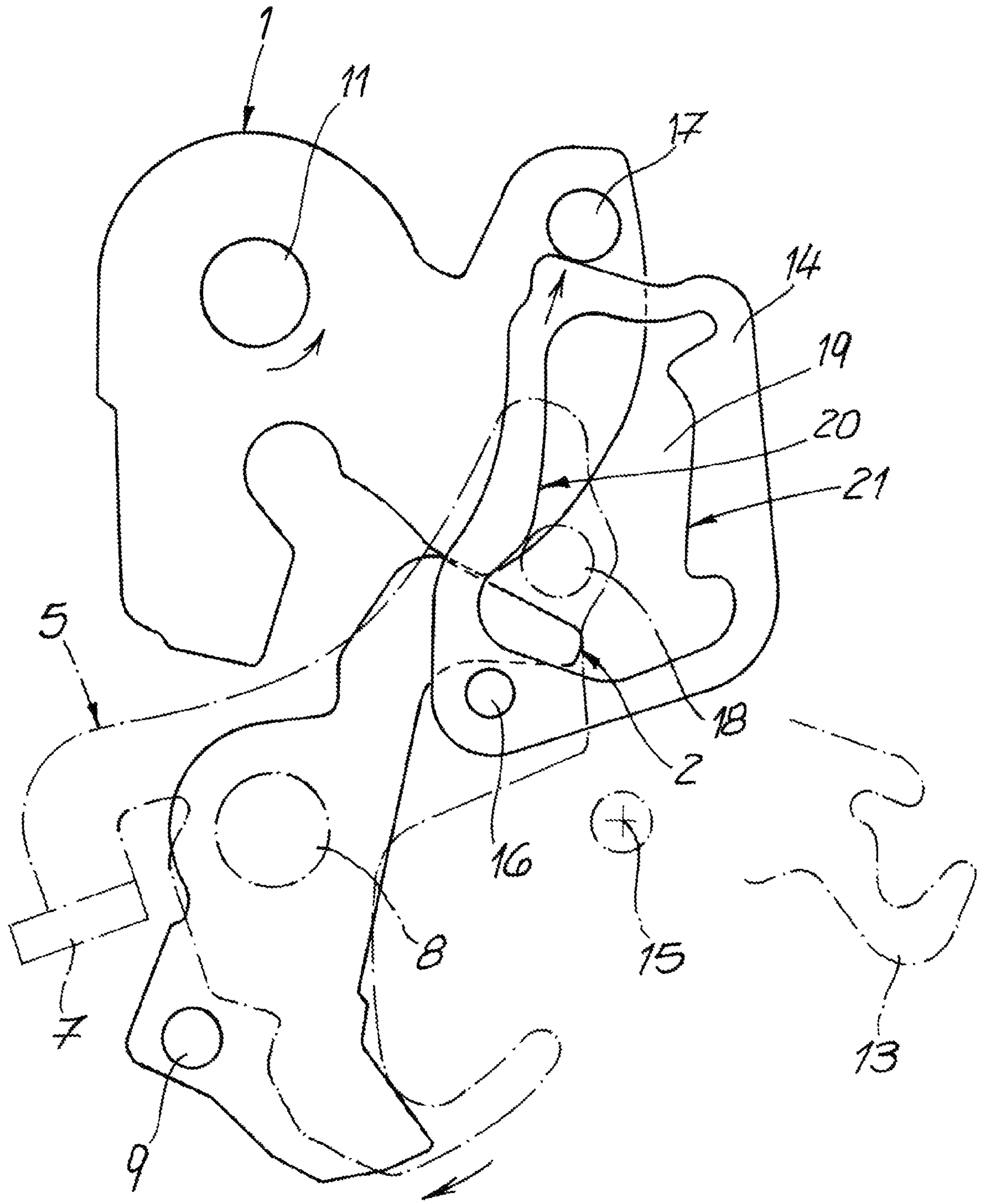

For this purpose, the drive pawl 14 according to the exemplary embodiment is designed as a frame pawl enclosing a cavity 19. The associated longitudinal legs define a guide contour 20 and an ejection contour 21 on the inside, the design and mode of operation of which will be explained in more detail below. In any case, a guided pushing movement of the transfer lever 14 is generated during the closing process with the aid of the aforementioned pivoting movement of the transfer lever 13 caused by the closing drive 12, 13, 14, with the aid of which transfer lever the drive pawl 14 works on the pin 17 on the catch 1 and thereby moves the catch 1 in the closing direction, as can be seen in FIGS. 5A and 5B. The locking mechanism 1, 2, 3 is shown in the pre-ratchet position in FIG. 5A. As a result of the drive pawl 14 abutting the pin 17 of the catch 1, the aforementioned pushing movement occurs during the transition from the pre-ratchet position according to FIG. 5A in the transition to FIG. 5B, and the catch 1 and therefore the locking mechanism 1, 2, 3 are closed.

Figure 5C:
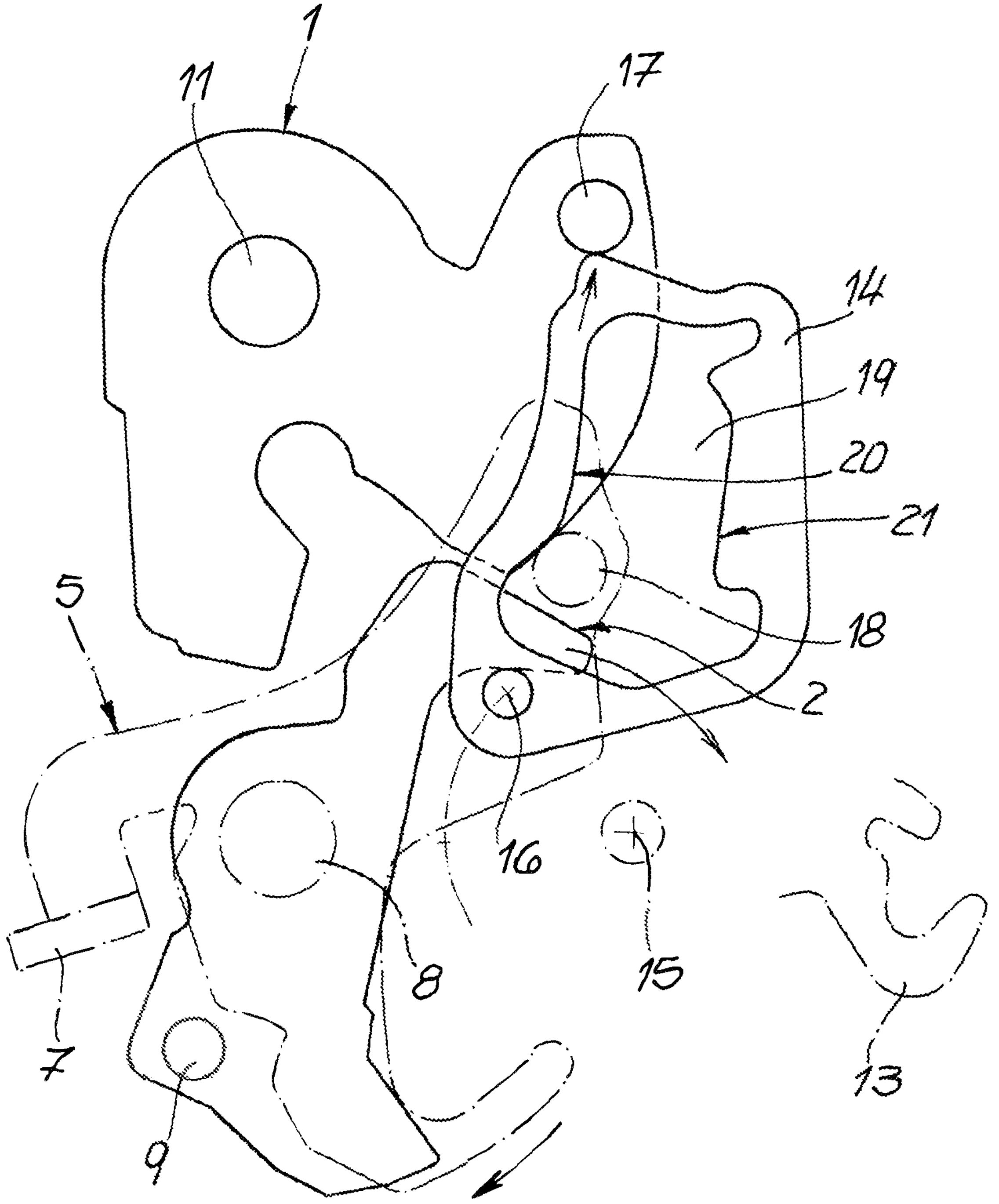

In the transition from FIG. 5B to FIG. 5C, the locking mechanism 1, 2, 3 finally reaches the overtravel position described at the beginning in this way. To open the locking mechanism 1, 2, 3, the catch 1 is held in this overtravel position with the aid of the closing drive 12, 13, 14. As a consequence, the opening drive 4 can open the pawl or first pawl 2. For this purpose, the opening drive 4 is acted upon in such a way that the guide pin 18 on the release lever 5 adopts its position in the cavity 19 shown in FIG. 5. Since the guide pin 18 on the release lever 5 is spaced apart from the ejection contour 21 when the pawl or first pawl 2 is in this open position and consequently does not act on the ejection contour 21, the drive pawl 14 is unchanged and still abuts the pin 17 of the catch 1 as part of the closing drive 12, 13, 14 as before. In the overtravel position of FIG. 5C, the opening drive 4 can now open the pawl 2, 3. For this purpose, the pawl 2 is lifted from the spaced-apart catch 1 with the aid of the release lever 5 in accordance with the clockwise movement indicated in FIG. 5C.

Starting from the overtravel position shown in FIG. 5C, the closing drive 12, 13, 14 can now be moved back when the locking mechanism is open. The opening drive 4 still acts on the pawl or first pawl 2 in the opening direction here. Since the pawl 2 is consequently lifted off the catch 1, the closing drive 12, 13, 14 can move back into its starting position. The catch 1 is opened. The opening drive 4 for the pawl 2 can now also be moved back into its starting position. This is because the catch 1, which is in the open position, ensures that the pawl 2 cannot engage in a ratchet position, but rather abuts the open catch 1.

In the closing process of the locking mechanism 1, 2, 3 shown in FIG. 5A to 5C, a distinction can be made between an electrical and a mechanical movement range of the release lever 5. The electrical movement range of the release lever 5 corresponds to the fact that the guide pin 18 on the release lever 5 adopts a position which corresponds approximately to its arrangement in the cavity 19 of the drive pawl 14. This is to be distinguished from the mechanical movement range, which corresponds to the fact that the guide pin 18 in question on the release lever 5 can interact with the ejection contour 21. This can be understood by way of example using the functional sequences according to FIGS. 5B and 5C. The closing process can be interrupted mechanically at any time. For this purpose, it is only necessary for the internal operating lever or external operating lever 6 to be acted on via the aforementioned internal door handle or external door handle in such a way that the release lever 5 is pivoted, specifically to the extent that its guide pin 18 comes to abut the ejection contour 21. As a result, the drive pawl 14 can be ejected and the closing process is consequently interrupted. This is because the closing drive 12, 13, 14 is then mechanically separated from the catch 1, because the drive pawl 14 can no longer act on the pin 17 on the catch 1 with the described pushing movement.

| Reference sign | Name |
|---|---|
| 1 | catch |
| 2 | convenience pawl |
| 3 | pre-ratchet pawl |
| 4 | opening drive |
| 5 | release lever |
| 6 | internal operating lever/external operating lever |
| 7 | stop edge |
| 8 | axis |
| 9 | connecting pin |

-continued

| Reference sign | Name |
|---|---|
| 10 | axis of the pre-ratchet pawl |
| 11 | axis of the catch |
| 12 | closing drive |
| 13 | transfer lever |
| 14 | drive pawl |
| 15 | axis of the transfer lever |
| 16 | axis of rotation |
| 17 | pin on the catch |
| 18 | guide pin on the release lever |
| 19 | cavity |
| 20 | guide contour |
| 21 | ejection contour |

The invention claimed is:

1. A motor vehicle door latch comprising:

a locking mechanism including a catch and a pawl;

a closing drive, wherein the closing drive has a drive pawl; and an opening drive for the locking mechanism, wherein the closing drive is configured to transfer the catch to an overtravel position via mechanical engagement with the drive pawl during closing of the locking mechanism, wherein during opening of the locking mechanism, the catch is held in the overtravel position by the closing drive when the opening drive moves the pawl to an open position of the pawl, wherein the opening drive holds the pawl in the open position when the closing drive moves back to a position in which the closure drive is configured to enable the catch to move from the overtravel position to an open position of the catch when the locking mechanism is open, wherein the closing drive is configured to mechanically separate from the catch during the closing of the locking mechanism in response to actuation of an internal operating lever or actuation of an external operating lever, such that a release lever engages an ejection contour of the drive pawl.

2. The motor vehicle door latch according to claim 1, wherein the opening drive acts on the release lever.

3. The motor vehicle door latch according to claim 1, wherein the opening drive and the internal operating lever and/or the external operating lever engage on a common stop edge of the release lever.

4. The motor vehicle door latch according to claim 2, wherein the release lever is mounted coaxially with the pawl.

5. The motor vehicle door latch according to claim 2, wherein the release lever interacts with a pin of the pawl during the opening of the locking mechanism.

6. The motor vehicle door latch according to claim 1, wherein the closing drive further has a transfer lever.

7. The motor vehicle door latch according to claim 6, wherein one end of the drive pawl is rotatably connected to the transfer lever, and another end of the drive pawl interacts with a pin of the catch.

8. The motor vehicle door latch according to claim 7, wherein the drive pawl converts a motorized pivoting movement of the transfer lever into a pushing movement that works on the pin of the catch to move the catch to a close position during the closing of the locking mechanism.

9. The motor vehicle door latch according to claim 1, wherein the drive pawl has a guide contour that interacts with the release lever.

10. The motor vehicle door latch according to claim 9, wherein the guide contour interacts with a guide pin on the release lever.

11. The motor vehicle door latch according to claim 9, wherein the guide contour and the ejection contour are spaced apart from one another to distinguish a motorized and a manual movement range of the release lever from one another.

12. The motor vehicle door latch according to claim 10, wherein the drive pawl is formed as a frame pawl which encloses a cavity together with the guide pin of the release lever which is movable therein, wherein the frame pawl includes internal longitudinal legs that define the guide contour and the ejection contour.

13. The motor vehicle door latch according to claim 1, further comprising a pre-ratchet pawl, wherein the pawl is a convenience pawl.

14. The motor vehicle door latch according to claim 13, wherein the release lever is acted on by the opening drive, wherein the release lever and the convenience pawl are mounted coaxially, wherein movement of the release lever in a first rotational direction causes movement of the convenience pawl in the first rotational direction.

15. The motor vehicle door latch according to claim 14, further comprising a connecting pin connected to the convenience pawl.

16. The motor vehicle door latch according to claim 14, wherein during the opening of the locking mechanism, the catch is released from the convenience pawl and the release lever simultaneously pivots the pre-ratchet pawl.

17. A motor vehicle door latch comprising:

a locking mechanism including a catch and a pawl;

a closing drive;

an opening drive for the locking mechanism, wherein the closing drive is configured to transfer the catch to an overtravel position, wherein during opening of the locking mechanism, the catch is held in the overtravel position by the closing drive when the opening drive moves the pawl to an open position of the pawl, wherein the opening drive holds the pawl in the open position when the closing drive moves back to a position in which the closing drive is configured to enable the catch to move from the overtravel position to an open position of the catch when the locking mechanism is open, wherein the closing drive has a drive pawl and a transfer lever; and a release lever, wherein the drive pawl has a guide contour that interacts with the release lever, and an ejection contour that interacts with an internal operating lever or an external operating lever.

* * * * *